July 1, 1969 D. V. CHENOWETH 3,452,776

PRESSURE CONTROL VALVE

Filed July 14, 1967 Sheet 1 of 2

INVENTOR.
DAVID V. CHENOWETH
BY Bernard Kriegel
ATTORNEY.

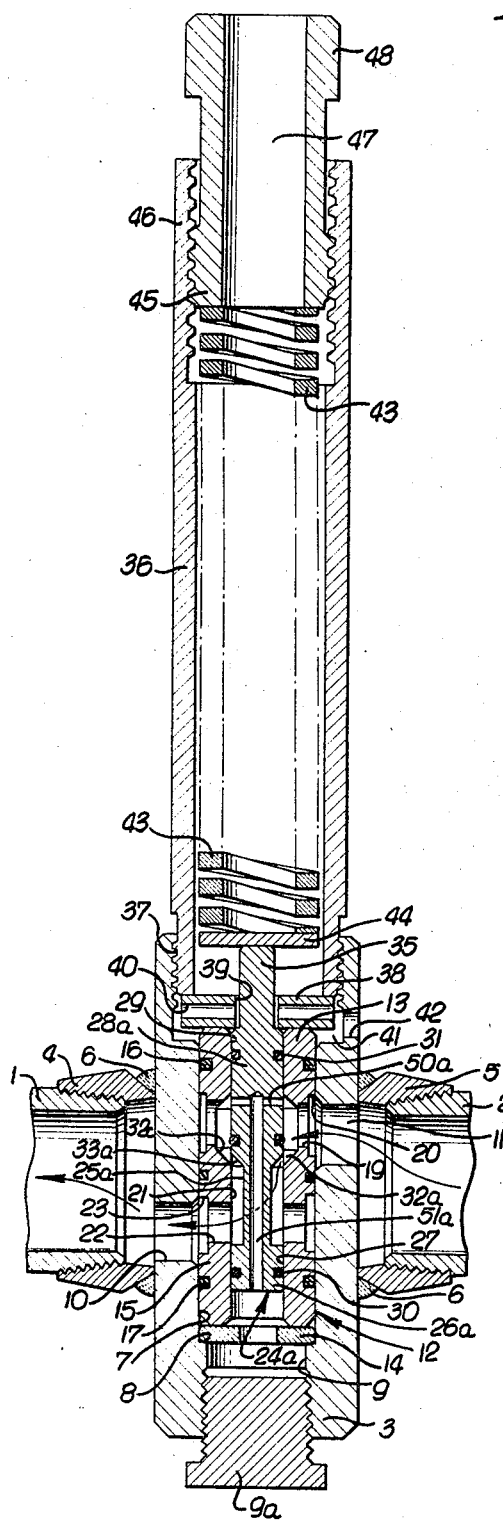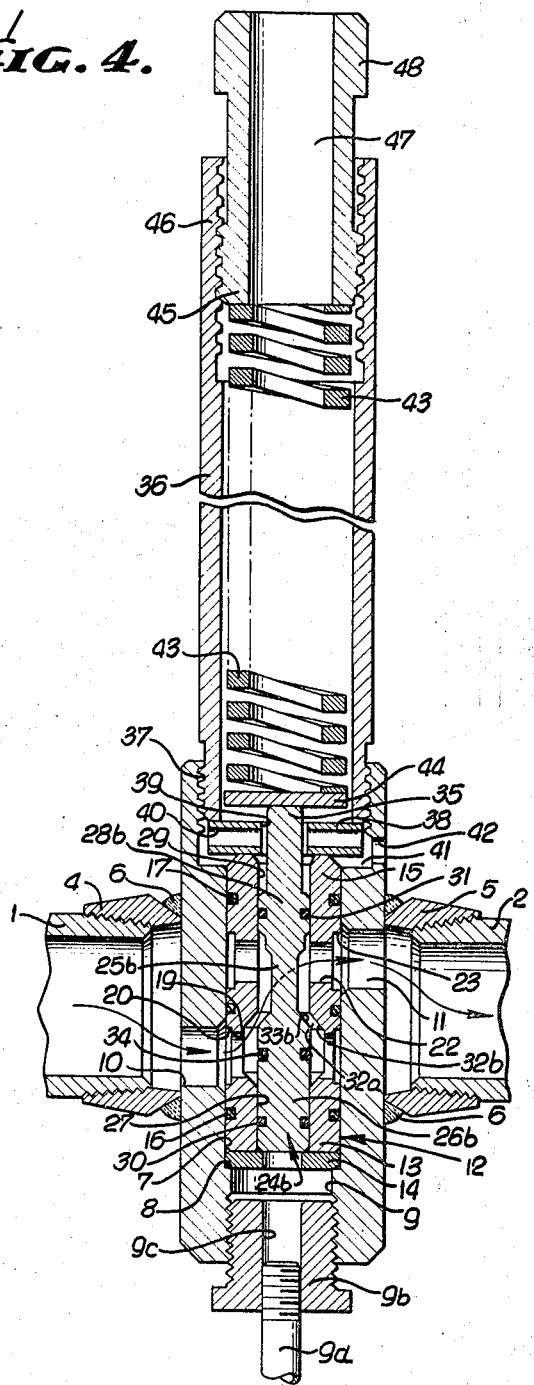

United States Patent Office 3,452,776
Patented July 1, 1969

3,452,776
PRESSURE CONTROL VALVE
David V. Chenoweth, Houston, Tex., assignor to Baker Oil Tools, Inc., City of Commerce, Calif., a corporation of California
Filed July 14, 1967, Ser. No. 653,373
Int. Cl. F16k *17/06, 31/143*
U.S. Cl. 137—454.6                                9 Claims

ABSTRACT OF THE DISCLOSURE

A pressure control valve in which a spring-loaded valve piston is pressure biased to automatically control the pressure of fluid flowing therethrough.

---

The present invention relates to pressure control valves, and more particularly to a pressure control valve assembly which includes a spring-loaded piston valve responsive to fluid pressure, whereby to maintain a constant pressure condition in the fluid flowing through the valve.

In the control of the pressure of fluid flowing through a conduit, it oftentimes is necessary or desirable to employ a valve which will function to maintain a constant upstream or downstream pressure, and which will, under some circumstances, effect an automatic shutoff in the event of extraordinary pressure change. Such valves have practical application, for example, to the maintenance of a constant back pressure on pumps and compressors, the maintenance of a constant flow line pressure in a conduit leading from flowing wells, either of the single or multiple zone type, the controlling of injection pressures in various flooding or repressuring operations in which fluid is injected into the earth formation, as well as other applications.

An object of the present invention is to provide a valve construction which is suited to the above, and other, applications, and wherein a valve piston is spring biased in one direction and pressure loaded in the other direction so that a constant pressure condition will be maintained in the fluid stream passing through the valve.

More specifically, an object of the invention is to provide a pressure control valve for maintaining upstream pressure at a constant value, and wherein the valve is normally biased closed by spring pressure and adjustably held open by the upstream pressure so that the upstream pressure remains constant depending upon the spring force applied.

Still another object of the invention is to provide a pressure control valve in which a valve piston is normally biased open by a spring and biased closed by the application of fluid pressure counter to the spring force, so as to maintain a constant pressure downstream, the counterpressure being derived from the flow line or from some exterior source.

Yet another object of the invention is to provide a valve construction including a spring-biased piston and a pressure chamber in which an end of the piston is disposed for the application of pressure thereto counter to the spring force, and in which the assembly is adapted to enable the rapid interchange of components so that the valve will function either to control upstream or downstream pressure, and so that the assembly may be responsive to either line pressure or pressure from an external source.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention.

Referring to the drawings:

FIG. 3 is a view in longitudinal section, illustrating an upstream pressure control valve made in accordance with the invention;

FIG. 4 is a view corresponding generally to FIGS. 1 and 3, and illustrating a modification of the valve assembly in which the valve piston is pressure biased by pressure derived from an external source.

Figure 1:
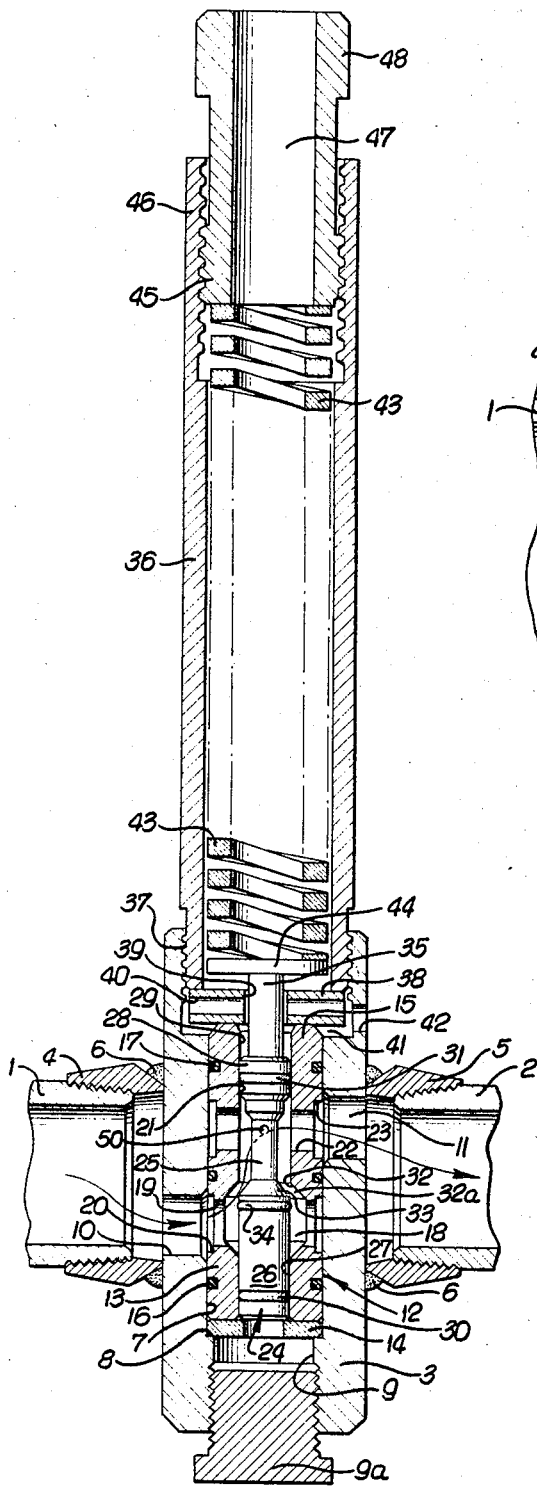
FIGURE 1 is a view, partly in longitudinal section and partly in elevation, illustrating a downstream pressure control valve made in accordance with the invention.

Referring first to FIG. 1, the invention is illustrated as embodied in a downstream pressure control valve assembly. This assembly is adapted to be disposed in a conduit including an upstream or inlet section 1 and a downstream or outlet section 2. Included in the assembly is a valve body 3 having an inlet fitting 4 and an outlet fitting 5, these respective fittings being threaded for connection to the conduit ends and being welded, or otherwise suitably secured, as at 6, 6 to the body 3.

The body 3 comprises an elongated tubular member, in the illustrative embodiment, having a bore 7 therein terminating at one end at a shoulder 8, there being a reduced bore 9 leading endwise into the bore 7 and closed by a threaded plug 9a. The body 3 is further provided with an inlet port 10 and with an outlet port 11, which respectively communicate with the fittings 4 and 5. Disposed within the bore 7 is a cylinder or sleeve 12 comprising a lower cylindrical section 13 sealingly disposed in the bore 7, and which abuts at its lower end with a spacer washer 14 bottoming on the body shoulder 8. The sleeve 12 also includes an upper cylindrical section 15 which is also sealingly disposed in the bore 7. Sealing of the sleeve sections 13 and 15 in the bore 7, in the illustrative embodiment, is accomplished by means of O-rings 16 and 17 carried in grooves in the respective sections and sealingly engaged with the inside wall of the body 3.

Intermediate the sleeve end sections 13 and 15, the sleeve 12 is provided with a valve chamber 18 communicating with the inlet port 10 through a suitable number of circumferentially spaced ports 19 in the sleeve 12, the latter being provided about its outer periphery with an annular groove 20 which provides an annular flow passage about the sleeve in communication with the inlet port 10 in body 3.

The sleeve 12 is provided with a bore 21 extending axially of the sleeve through the sleeve end 15 and into the chamber 18. In order to establish communication between the outlet port 11 of the body 3 and the bore 21, the sleeve 12 in the end section 15 thereof is provided with a suitable number of circumferentially spaced ports 22 opening into an external annular groove 23 in the sleeve, which provides an annular flow passage for the flow of fluid to the outlet port 11 from the bore 21.

In order to control the flow of fluid through the valve assembly, a valve piston 24 is provided, which includes a stem section 25 reciprocable in the sleeve bore 21 and extending into the chamber 18, the stem section 25 having at one end a piston section 26 slidably disposed in a bore 27 in the sleeve end section 13. At its other end, the stem section 25 is provided with a piston section 28 slidably disposed in a bore 29 in the sleeve end 15. In the illustrative embodiment, each of the piston sections 26 and 28 is sealingly disposed in the respective bores 27 and 29, as by means of O-ring seals 30 and 31.

The sleeve 12 is provided internally with a beveled wall 32 circumscribing the piston stem 25, the piston section 26 having a cooperating beveled piston surface 33 to provide an annular flow path or valve passage 32a therebetween, the flow area of which is a function of the axial disposition of the valve piston 24 within the sleeve 12. In other words, as a function of the axial positioning of the valve piston 24, a fluid throttling action will occur between the piston section 26 and the beveled wall 32. If desired, the piston section 26 may be provided with a suitable seal 34, such as an O-ring, whereby to effect an absolute shut-off of flow through the valve passage 32a.

In order to establish the axial position of the the valve piston 24 in the sleeve 12, the piston section 28 has a stem 35 which extends axially through the end of the sleeve 12 for engagement by spring means which will impose an endwise force on the piston, tending to move it downwardly, as seen in FIG. 1, whereby to normally open, or increase the opening of, the valve passage 32a.

This spring means comprises an elongated housing or tube 36 threadedly connected to the body 3, as at 37, and bottoming on a disc 38 which abuts the adjacent end section 15 of the sleeve 12. This disc 38 has a central opening 39 therethrough slightly larger than the stem 35. In addition, the disc 38 has a suitable number of passages or ports 40 therein leading from the central opening 39 outwardly into a chamber 41 defined between the disc and the body 3. Leading from this chamber 41 is a bleed opening 42, providing communication between the inside of the housing 36 and the outside of the body 3 through the bleed opening 42, the chamber 41, and disc ports 40 into the central opening 39 through the disc.

Within the housing 36 is a coiled compression spring 43 which abuts at its lower end on a spring seat or washer 44 engaged with the outer end of the stem 35, the upper end of the spring 43 abutting against a spring adjuster plug or seat 45 adjustably and threadedly disposed in the threaded upper end 46 of the housing 36. The plug 45 has an opening 47 therethrough, and also a suitable tool engaging enlargement 48, whereby the plug 58 may be axially adjusted by rotation thereof to impose on the valve piston 24 a desired spring force tending to bias the same axially toward an opening direction.

Figure 2:
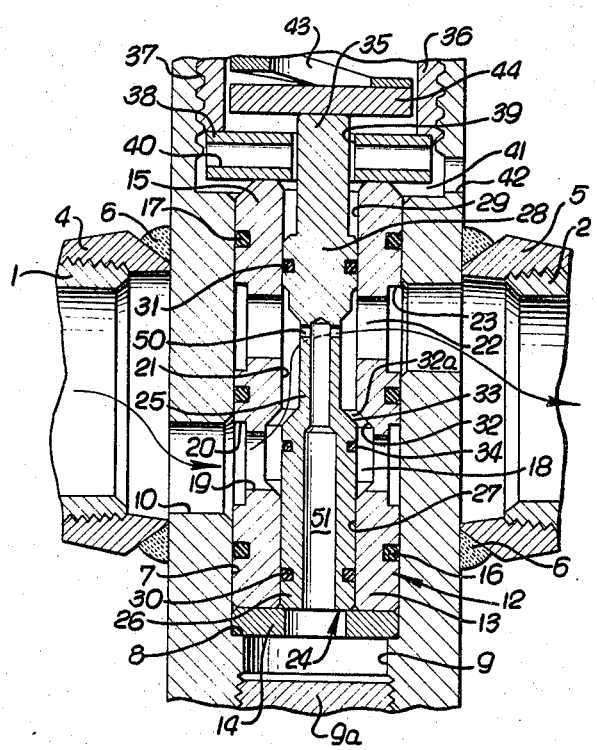
FIG. 2 is an enlarged fragmentary detail view in section, more particularly showing the details of the valve of FIG. 1.

In order to provide a counterforce tending to move the valve piston 24 in a closing direction, passage means are provided for conducting fluid from the downstream side of the throttle passage 32a to the body bore 9. Specifically, as best seen in FIG. 2, the piston stem section 25 is provided with a suitable number of ports 50 leading radially from the bore 21 in the sleeve 12 into a central passage 51 in the piston, which extends axially through the piston end section 26, opening into the bore 9 in the body 3. Thus, the fluid pressure present in the bore 21 downstream of the throttle valve passage 32a will be imposed on the end area of the piston portion 26, the fluid pressure passing through the ports 50 and passageway 51 to provide a force acting counter to the force of the adjustable spring 43.

In the operation of the embodiment of the invention described above, it will be apparent that fluid will flow through the conduit section 1 and fitting 4 into the body inlet port 10, and thence into the annular space provided by the groove 20, flowing through the sleeve ports 19 into the chamber 18. From the chamber 18, fluid will flow through the throttle valve passage 32a into the sleeve bore 21, and from the latter through the sleeve ports 22 to the annulus or groove 23 provided in the sleeve, continuing its flow from this annulus through body inlet port 11 into the fitting 5, and then on into the conduit section 2.

Pressure regulation is secured by the fact that the throttle valve piston 24 will be held in a position at which the downstream pressure is substantially constant, inasmuch as the downstream pressure will act on the transverse area of the piston section 26, to tend to close the valve against the force of the spring 43 when the downstream pressure tends to increase, thereby further throttling the flow through the passage 32a and decreasing the downstream pressure. Any tendency of the downstream pressure to decrease will result in the imposition of a lesser force on the piston section 26 of the throttle valve piston 24, so that the spring 43 will tend to shift the throttle valve means to a greater open position, whereby to allow increased flow therethrough and increase the downstream pressure.

Referring now to FIG. 3, another embodiment of the invention is shown wherein the throttle valve means is normally closed. This is to say that, in the embodiment of FIG. 3, the spring means provides a force tending to close the throttle valve means, while the pressure of fluid flowing through the throttle valve means provides a counterforce tending to open the throttle valve means, to maintain a constant upstream pressure.

It will be noted that the assembly in FIG. 3 includes the same body 3 and fittings 4 and 5, as well as the same spring housing 36, spring 43, and adjuster plug 48 as in the embodiment of FIG. 1. Therefore, the entire valve body assembly is designated with the same reference characters as in FIGS. 1 and 2. Moreover, it will also be noted that the valve sleeve 12 of FIG. 3 is the same valve sleeve as is illustrated in FIG. 1, but turned end for end, so that the flow of fluid through the assembly will be through the port 11 in the body 3, and thence through the ports 19 in the sleeve 12 into the chamber 18, from which fluid will pass into the bore 21 within the sleeve 12. From this bore, fluid will flow through the sleeve ports 22 and body ports 10 into the fitting 4 and conduit 1. In other words, in the embodiment of FIG. 3, the conduit 1 is an outlet conduit, whereas, in FIG. 1, the conduit 1 is an inlet conduit; while in FIG. 3, the conduit 2 is an inlet conduit and in FIG. 1, the conduit 2 is an outlet conduit, all as indicated by the arrows in the respective views.

Likewise, as in the case of the previously described embodiment, the regulator valve piston 24a of FIG. 3 is spring loaded by the spring 43 in one direction, and the pressure of fluid flowing through the assembly is productive of a force counter to the spring force. In this connection, it will be noted that, in the embodiment now being described, the valve piston 24a is somewhat modified as compared with the valve piston of FIG. 1. In FIG. 3, the valve piston 24a is provided with an upper section 28a sealingly and slidably disposed in the bore 29 of the valve sleeve 12, the lower piston section 26a of the valve piston being slidably disposed in the bore 21 of the valve sleeve 12. Leading into the piston section 28a are ports 50a communicating with a longitudinally extended passage 51a leading through the central stem section 25a of the piston 24a, and through the piston end section 26a into the bore 9 of the body 3, which, as in the previously described embodiment, is closed by a plug 9a. The effective valve passage 32a or flow area through the throttle valve means is defined between the frusto-conical piston surface 33a on the piston section 28a and the opposing beveled wall 32c of the sleeve 12.

It will now be understood that the fluid flowing into the body 3 through the port 11 will pass into the sleeve 12 through the ports 19, and thence through the throttle valve passage 32a to the sleeve ports 22 and the body port 10.

Any tendency of the pressure upstream of the throttle valve means to drop will result in a reduced pressure in the body bore 9, so that the spring 43 will tend to close the throttle valve means to reduce the flow rate therethrough by moving the piston valve 24a to bring its surface 33a closer to the surface 32c to restrict the passage 32a and thereby tend to increase the upstream pressure or tend to maintain the same constant. Conversely, any tendency of the upstream pressure to increase will be productive of an increased pressure in the body chamber 9 acting on the piston section 26a to open the throttle valve means against the spring 43, to allow a greater flow rate through the throttle valve means and reduce the upstream pressure to the desired constant value.

Referring now to FIG. 4, still another embodiment of the invention is illustrated, in which all of the components comprising the valve body 3 and the spring assembly, including the housing 36 and the spring 43, and also including the sleeve 12, are identical to the structure disclosed in FIG. 1. The piston 24b of FIG. 4 has the same exterior configuration as the piston 24 of FIG. 1. That is to say, the piston 24b of FIG. 4 includes a piston section 28b and a piston section 26b spaced apart by an intermediate stem section 25b, with the respective piston sections 26b and 28b reciprocably and sealingly disposed in the bores 27 and 29 within the sleeve 12. However, in the embodiment of FIG. 4, it will be noted that there are no passage means in the assembly for conducting the pressure of fluid immediately upstream or downstream of the valve to the chamber 9 for action upon the end of the piston section 26b. Instead, in this embodiment, the bore 9 of the body 3 is closed by a modified plug or closure member 9b having a passage 9c leading into the bore 9, there being connected to the plug 9b a pilot conduit 9d which may be, in turn, connected to a suitable source of pressure derived either from the flow conduit or from a separate and suitable source.

In any event, it will now be apparent that the assembly of FIG. 4 will permit flow therethrough at a rate determined by the relationship between the fluid pressure supplied to body bore 9 through the control fluid pressure conduit 9d and the force of the spring 43, the spring force tending to normally open the valve, and the control fluid pressure providing a force counter to the spring force and tending to effect partial closure of the valve. The control fluid pressure can be derived from any desired source, which may be a source other than the pressure of fluid in the flow conduit, or it could be the fluid pressure in the conduit downstream of the valve. If the control fluid pressure be derived from the flow conduit 2 downstream of the throttle valve passage 32a, provided by the frusto-conical surface 33b on the piston section 26b and the opposing beveled wall 32b of the sleeve 12, then a reduction in pressure acting against the spring 43 will cause the throttle valve means to open further so as to increase the flow rate through the assembly, and, therefore, increase the downstream pressure to the desired value. On the other hand, an increase in the downstream pressure will cause the piston to shift against the force of the spring to decrease the area of the passage 32a and decrease the downstream pressure.

It will also be understood, without requiring further illustration, that there may be provided in the assembly of FIG. 4 an imperforate valve piston corresponding in external form to that shown in FIG. 3, and the valve sleeve 12 of FIG. 4 may be turned end for end as shown in FIG. 3, so that control fluid pressure supplied to the bore 9 of the body 3 in FIG. 4 through the control pressure pilot conduit 9b will act to oppose the spring 43, so as to tend to open the throttle valve means. If desired, the control fluid pressure may be derived from the flow conduit upstream of the valve assembly, to maintain a desired upstream pressure as a function of the control fluid pressure in relation to the force supplied by spring 43 acting on the valve piston.

I claim:

1. In a valve assembly: a body having an elongate bore, an abutment in said bore, a unitary valve sleeve removably mounted in said bore and having an axial bore and engaged with said abutment at one end of said sleeve, a spring housing connected to said body and having abutment means engaged with the opposite end of said sleeve for removably holding said sleeve in said elongate bore in engagement with said abutment, said body having an inlet opening and an outlet opening communicating with said elongate bore and spaced from one another axially of said elongate bore, said sleeve having inlet and outlet ports communicating with said inlet and outlet openings, respectively, and with said axial bore, said sleeve having a valve chamber communicating with said inlet port and also having a first cylinder axially to one side of said valve chamber and a second cylinder axially to one side of said outlet port, said sleeve having a first throttling valve surface at the downstream side of the valve chamber, a valve member having first and second piston portions reciprocable in said first and second cylinders, respectively, said valve member also having a stem portion intermediate said piston portions, said valve member and sleeve defining a flow path therebetween extending between said inlet and outlet ports, one of said piston portions extending into said valve chamber and having a second throttling valve surface upstream of and movable toward and from said first throttling valve surface in response to movement of said valve member in said sleeve, a spring in said housing acting on said valve member to move said valve member in one direction within said sleeve, and means for conducting fluid under pressure to one of said cylinders to move said valve member in the opposite direction within said sleeve.

2. A valve assembly as defined in claim 1; said sleeve having a pair of axially spaced external inlet and outlet grooves communicating with said inlet and outlet ports, respectively, and also communicating with said inlet and outlet openings, respectively.

3. A valve assembly as defined in claim 1; said conducting means comprising passage means extending through said valve member and leading between said one of said cylinders and said flow path downstream of said first throttling valve surface.

4. A valve assembly as defined in claim 1; said conducting means comprising passage means extending through said valve member and leading between said one of said cylinders and said flow path upstream of said first throttling valve surface.

5. A valve assembly as defined in claim 1; said sleeve having a pair of axially spaced external inlet and outlet grooves communicating with said inlet and outlet ports, respectively, and also communicating with said inlet and outlet openings, respectively, said conducting means comprising passage means extending through said valve member and leading between said one of said cylinders and said flow path downstream of said first throttling valve surface.

6. A valve assembly as defined in claim 1; said sleeve having a pair of axially spaced external inlet and outlet grooves communicating with said inlet and outlet ports, respectively, and also communicating with said inlet and outlet openings, respectively, said conducting means comprising passage means extending through said valve member and leading between said one of said cylinders and said flow path upstream of said first throttling valve surface.

7. A valve assembly as defined in claim 1; said first and second throttling valve surfaces both being tapered in the same direction.

8. A valve assembly as defined in claim 1; said sleeve having an internal cylindrical surface downstream of said first throttling valve surface, said one of said piston portions being movable into sealing relation to said internal cylindrical surface to close said flow path.

9. A valve assembly as defined in claim 1; said sleeve having a pair of axially spaced external inlet and outlet grooves communicating with said inlet and outlet ports, respectively, and also communicating with said inlet and outlet openings, respectively, said conducting means comprising passage means extending through said valve member and leading between said one of said cylinders and said flow path upstream of said first throttling valve surface, said first and second throttling valve surfaces both being tapered in the same direction, said sleeve having an internal cylindrical surface downstream of said first throttling valve surface, said one of said piston portions being movable into sealing relation to said internal cylindrical surface to close said flow path.

References Cited

UNITED STATES PATENTS

| | | | |
|---|---|---|---|
| 1,294,151 | 2/1919 | Page | 137—505.28 XR |
| 2,781,049 | 2/1957 | Binford | 137—494 XR |
| 2,825,309 | 3/1958 | Geiger | 137—494 XR |
| 3,045,695 | 7/1962 | Douglas | 137—509 |
| 3,103,230 | 9/1963 | Kutsche | 137—116.3 |
| 3,298,389 | 1/1967 | Freeman | 137—494.6 |

HAROLD W. WEAKLEY, *Primary Examiner.*

U.S. Cl. X.R.

137—494, 505.28, 509; 251—63